United States Patent [19]

Starr et al.

[11] 3,708,751

[45] Jan. 2, 1973

[54] DATA TRANSMISSION SYSTEMS

[75] Inventors: Arthur T. Starr, New Barnet; Brian C. Sewell, Teddington; Roy F. Lewis, Isleworth, all of England

[73] Assignee: Xerox Corporation, Stamford, Conn.

[22] Filed: Nov. 6, 1970

[21] Appl. No.: 87,545

[30] Foreign Application Priority Data

April 21, 1970 Great Britain......................19,038/70

[52] U.S. Cl.....................................325/38 B, 178/68

[51] Int. Cl...............................................H04b 1/100

[58] Field of Search........178/68, 61, 67, 66; 325/38, 325/38 A, 30, 63, 60, 163

[56] References Cited

UNITED STATES PATENTS 3,344,352 9/1967 Daguet....................................178/68

2,700,696 1/1955 Barker.....................................178/68

3,497,618 2/1970 Thayer....................................178/68

*Primary Examiner*—Robert L. Griffin

*Assistant Examiner*—Barry L. Leibowitz

*Attorney*—James J. Ralabate, John E. Beck and Franklyn C. Weiss

[57] ABSTRACT

A transmitter for a data transmission system, the transmitter including modulating apparatus intended to receive an input signal in the form of a binary data stream of pulse form signals at a predetermined repetition rate to transmit in response thereto a corresponding modulated carrier wave output which represents the binary data, the modulating apparatus being so arranged that the said output comprises, for each said pulse form signal and according to a prearranged code, either a normal sinusoid or an inverted sinusoid, in each case of the said carrier wave which has a frequency equal to the said repetition rate, or a signalless interval of duration equal to the period of that carrier wave.

12 Claims, 22 Drawing Figures

INVENTORS
ARTHUR T. STARR
BRIAN C. SEWELL
ROY F. LEWIS
BY
Franklyn C. Weiss
ATTORNEY INPUT LEVELS DIFFER BY 20db

DIRECT CARRIER
NO OFFSET
MEDIAN "A" & "B"
DISTORTION

LOSS 4.6db

RECOVERED CARRIER
10 C. OFFSET
MEDIAN "A" & "B"
DISTORTION

LOSS 5.8db

DATA TRANSMISSION SYSTEMS

This invention is concerned with improvements in or relating to data-transmission systems.

According to one aspect of the invention there is provided a transmitter for a data-transmission system, the transmitter including modulating apparatus intended to receive an input signal in the form of a binary data stream of pulse-form signals at a predetermined repetition rate to transmit in response a corresponding modulated carrier wave output which represents the said binary data, the modulating apparatus being so arranged that the said output comprises, for each said pulse-form signal and according to a prearranged code, either a normal sinusoid or an inverted sinusoid, in each case of the said carrier wave which has a frequency equal to the said repetition rate, or a signal-less interval of duration equal to the period of that carrier wave.

Conveniently, the said output comprises, for each binary zero digit of the data stream a corresponding said signal-less interval, and for each binary one digit of the data stream a corresponding said sinusoid which is alternatively normal and inverted for successive said binary one digits of the data stream. However, the corresponding complementary arrangement may be employed instead, wherein the representations of the said binary zero and binary one digits are interchanged.

Conveniently, the transmitter is arranged to receive the said binary data stream from a data store which supplies the said stream at a repetition rate determined by a clock signal, the transmitter including a clock system arranged to generate the said carrier wave and the said clock signal in synchronism.

Preferably, the transmitter is arranged to transmit together with the said output a first pilot wave which has the same frequency as the said carrier wave.

Conveniently, the first pilot wave is in phase quadrature with the said sinusoids and is of smaller amplitude than the amplitude of the said sinusoids together with which it is transmitted.

Preferably, the transmitter is arranged to transmit together with the said output first and second auxiliary pilot waves of which the frequencies differ by a predetermined amount.

Conveniently, the first auxiliary pilot wave is constituted by the first pilot wave.

According to a second aspect of the invention there is provided a receiver for a data-transmission system, the receiver including demodulating apparatus intended to receive an input signal which corresponds to a binary data stream of pulse-form signals at a predetermined repetition rate and which represents the said binary data, the input signal being intended to comprise, for each said pulse-form signal and according to a prearranged code, either a normal sinusoid or an inverted sinusoid, in each case of a carrier wave having a frequency equal to the said repetition rate or a signal-less interval of duration equal to the period of that carrier wave, the demodulating apparatus being arranged to respond to the said input signal to deliver a system signal having the form of the said binary data stream.

Conveniently, the said input signal is intended to comprise, for each binary zero digit of the data stream a corresponding said signal-less interval, and for each binary one digit of the data stream a corresponding said sinusoid which is alternately normal and inverted for successive said binary one digits of the data stream.

Preferably, the receiver is arranged to receive together with the said input signal a first pilot wave which has the same frequency as the said carrier wave, that pilot wave being supplied to the demodulating apparatus to effect demodulation of the said input signal into a demodulated signal.

Preferably, the receiver is arranged to receive together with the said input signal first and second auxiliary pilot waves of which the frequencies differ by a predetermined amount, the receiver including a mixing circuit supplied with the auxiliary pilot waves and arranged in response to generate a timing wave of frequency equal to the said repetition rate.

Conveniently, the first auxiliary pilot wave is constituted by the first pilot wave.

Conveniently, the receiver includes a sampling circuit arranged to sample, in accordance with the timing wave, a signal derived from the said demodulated signal, and also includes a testing circuit responsive to the said demodulated signal to generate timing signals indicating when the sampling circuit is required to effect the sampling, and also includes a control circuit responsive to the timing signals to vary the phase of the timing wave so as to tend to effect the said required sampling.

Conveniently, the testing circuit is arranged to combine the demodulated signal and at least one signal derived from the demodulated signal but delayed relatively thereto by a predetermined amount and to test when those combined signals exceed a predetermined amount.

Conveniently, there is only one of the said derived signals, and the said delay is equal to two periods of the said repetition rate.

The invention also includes a transmitter according to the invention together with a receiver according to the invention.

An example of the invention will now be described with reference to the accompanying drawings in which:

FIG. 1 is a waveform diagram illustrating the operation of the transmitter and the receiver of a data-transmission system according to the invention;

FIGS. 2(A) and 2(B) are block diagrams respectively of the transmitter (associated with a data store) and of the receiver;

Figure 7A:
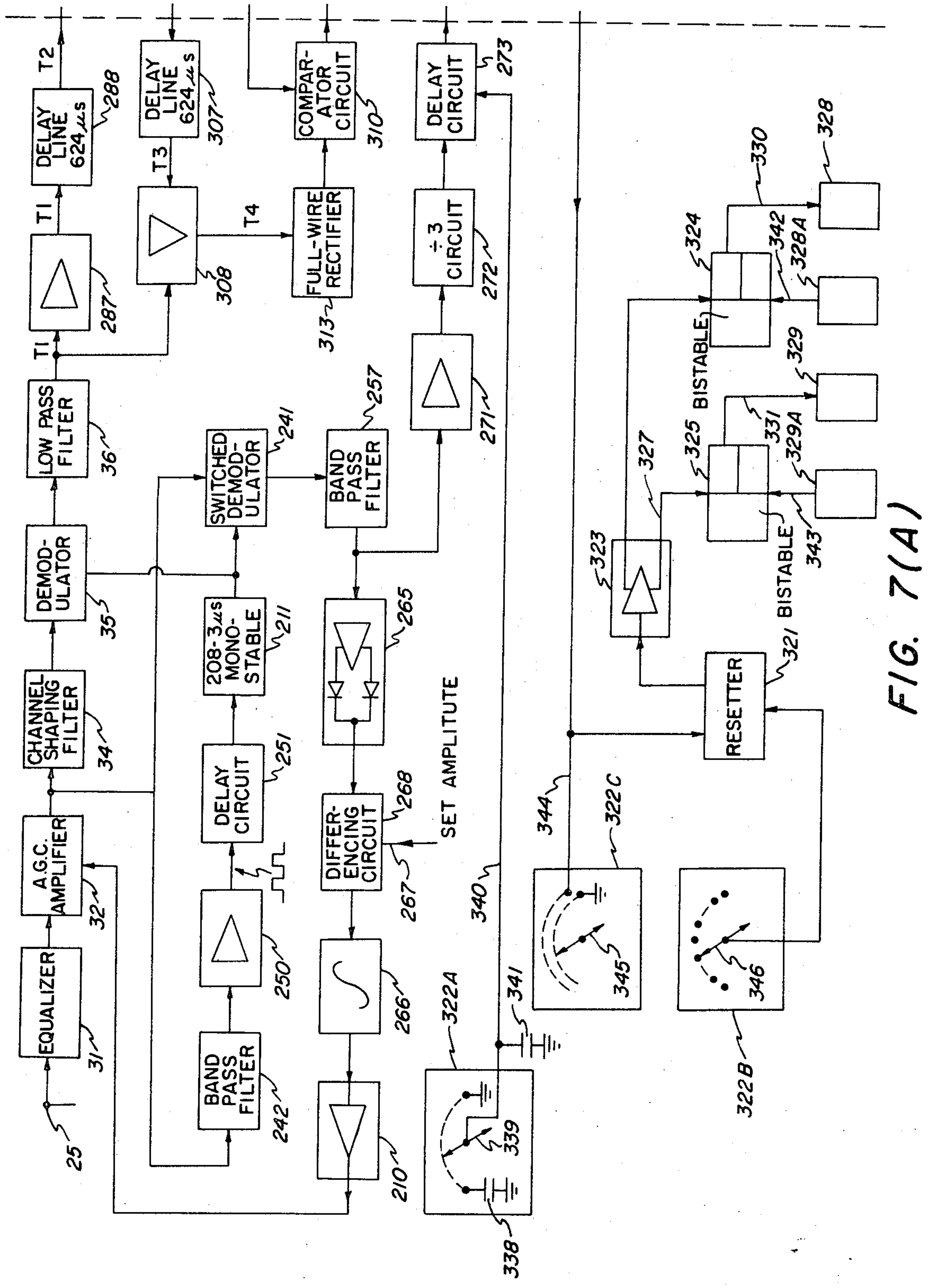
FIG. 7 is a schematic circuit diagram of the receiver.
Figure 7B:
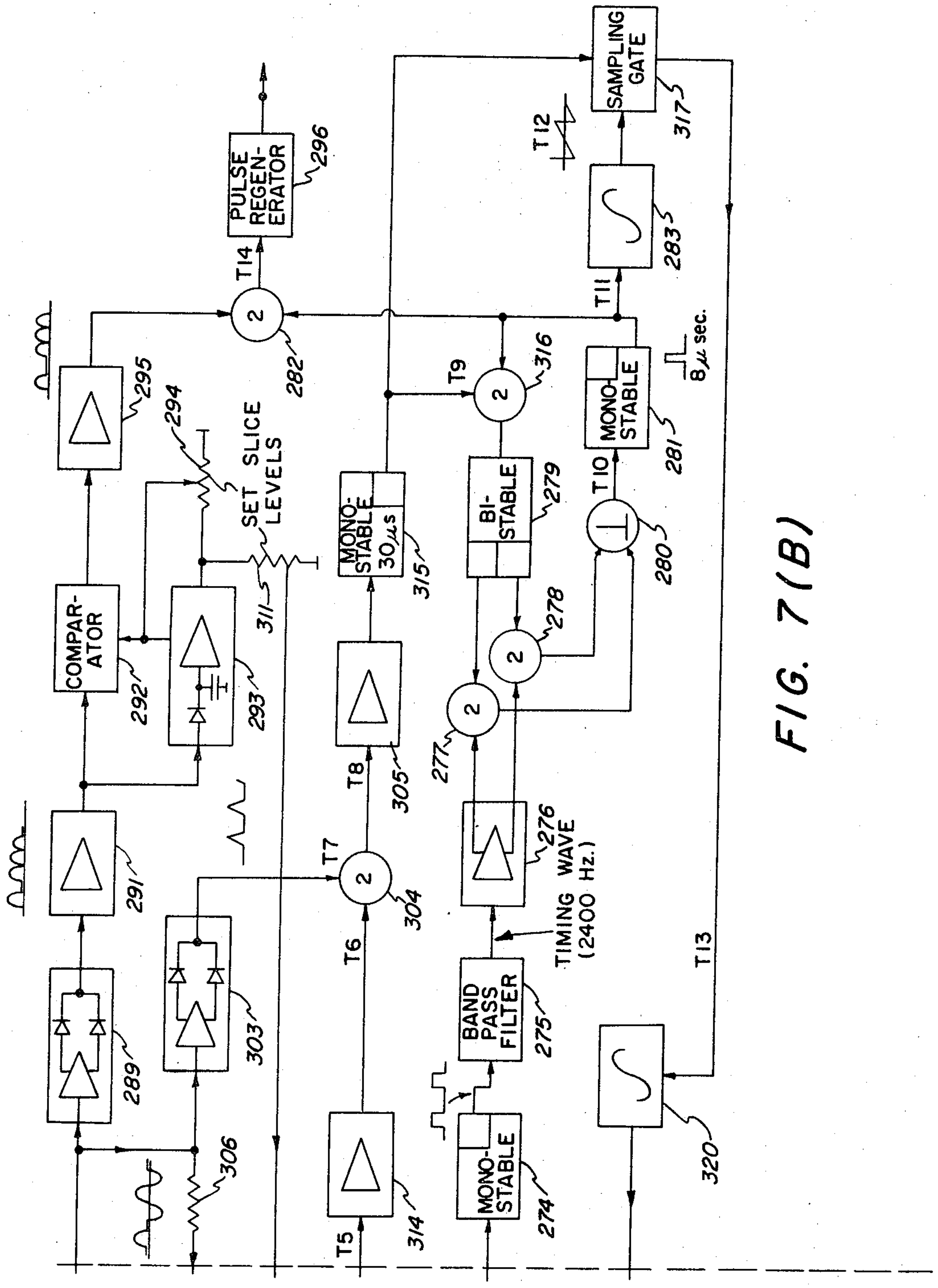
Figure 15:
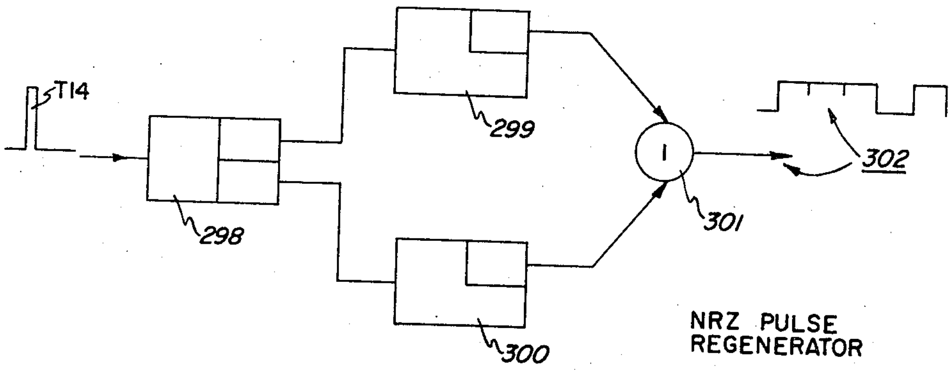
Figure 13A:
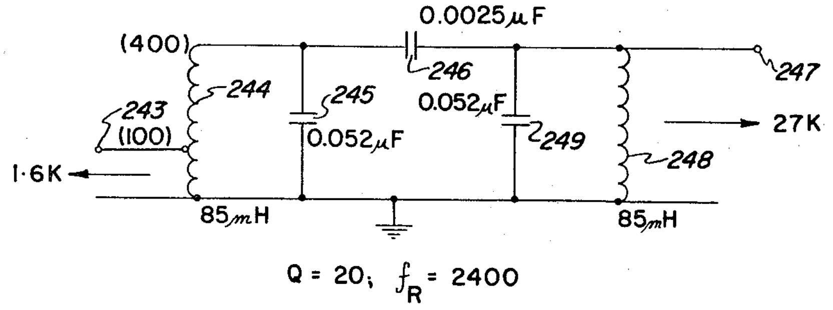
Figure 13B:
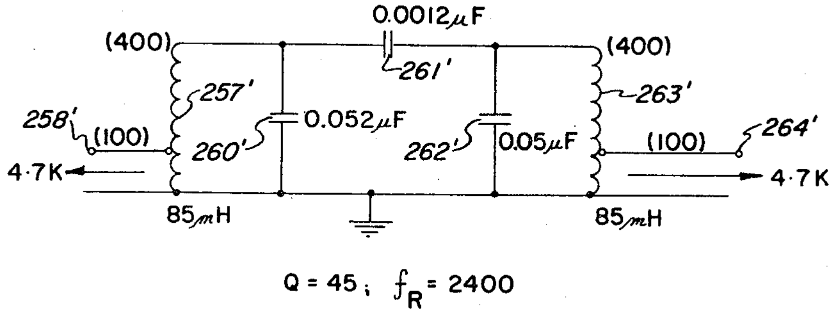
Figure 13C:
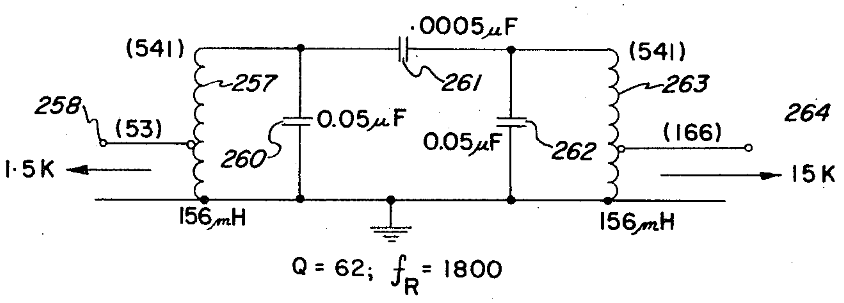
Figure 14A:
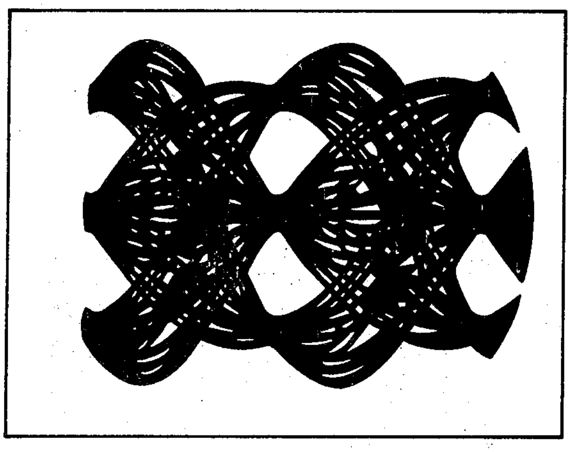
Figure 16A:
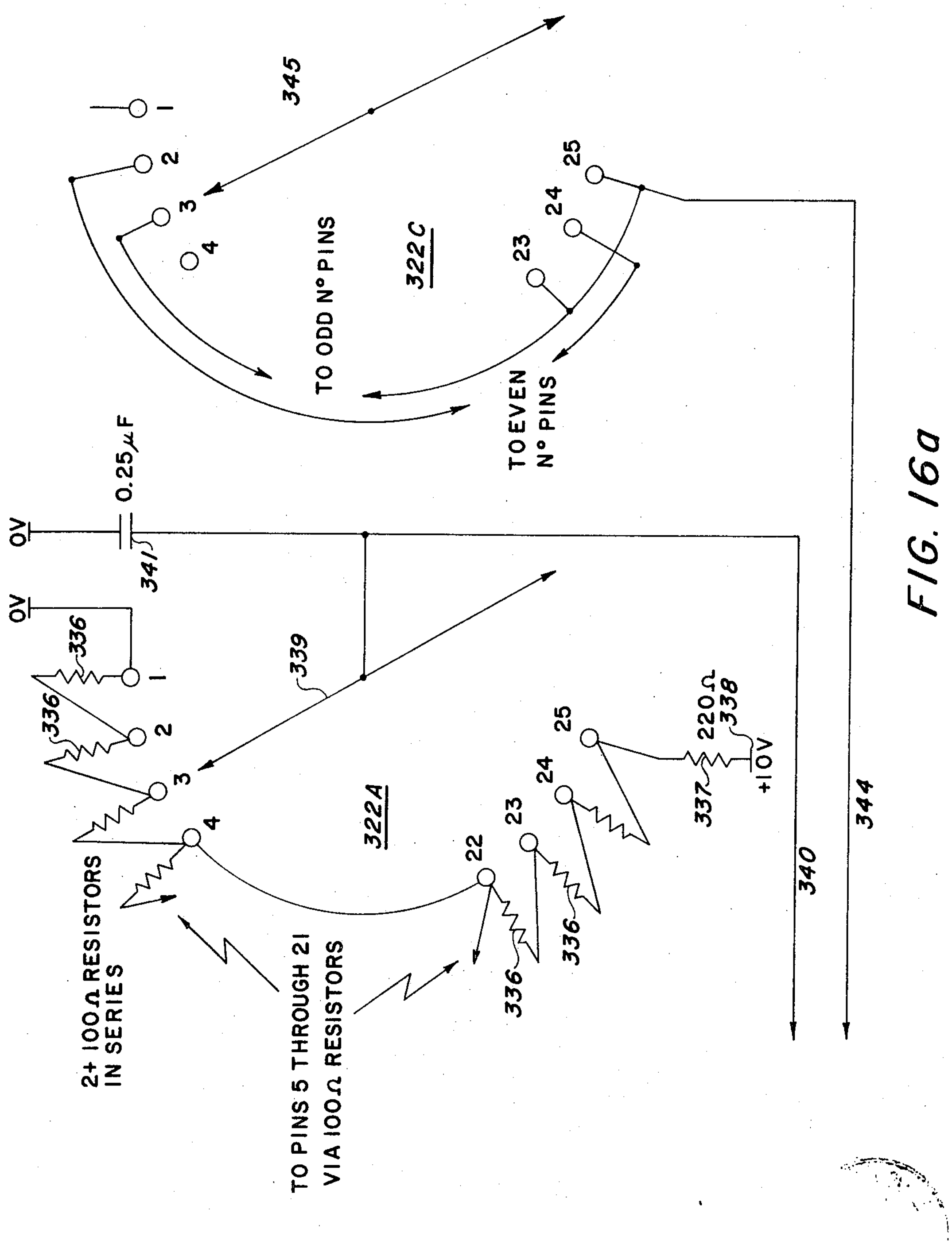
Figure 16B:
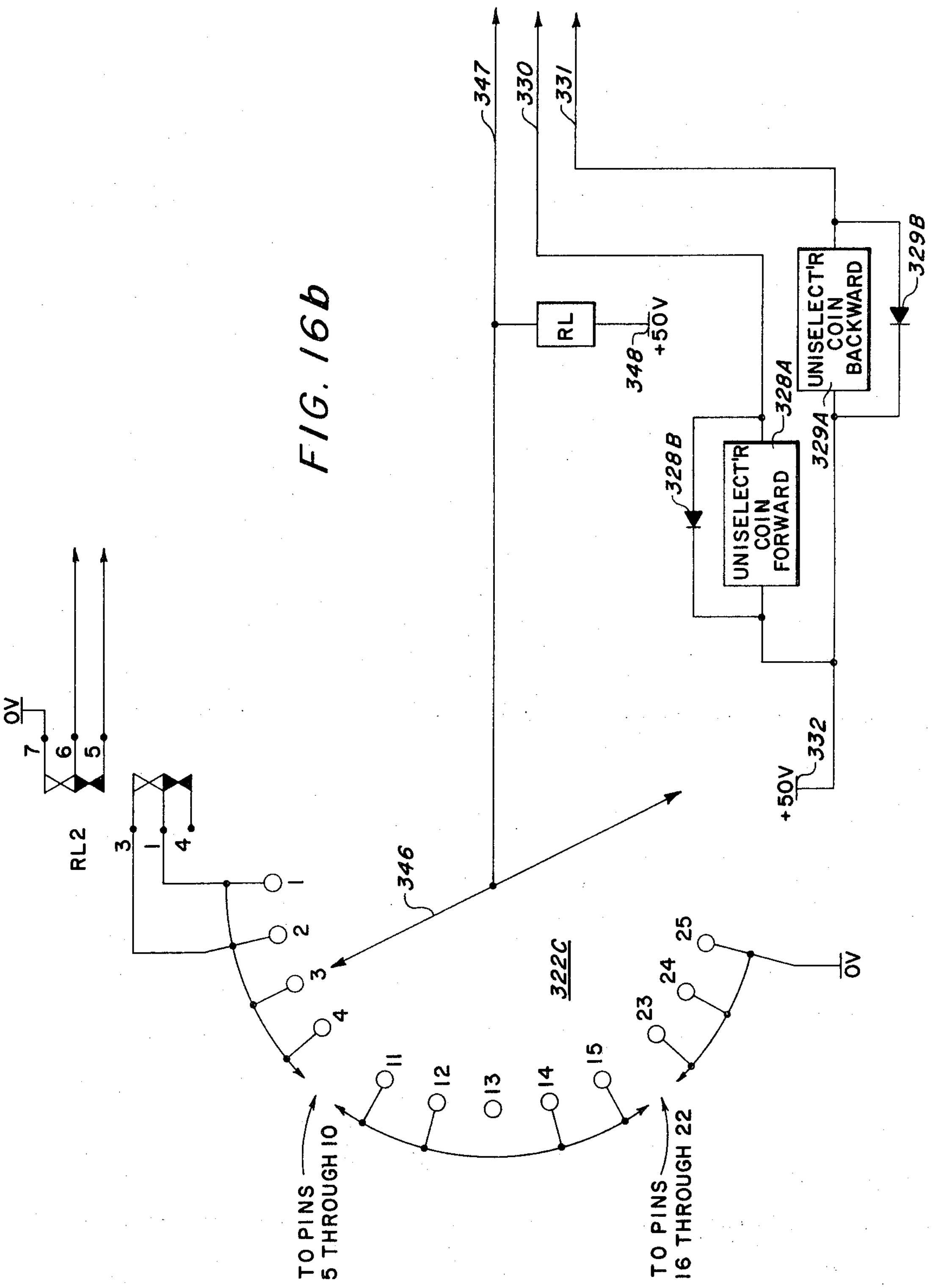

FIGS. 13(A), (B) and (C) are circuit diagrams of certain other filters employed in the receiver of FIG. 7;

FIGS. 14 (A) and 14 (B) shows further eye patterns relating to the filter of FIG. 13 (A), FIG. 15 is a block circuit diagram of a pulse regenerator, and FIGS. 16 *a* and 16 *b* are a circuit diagram of a uniselector arrangement employed in the receiver of FIG. 7.

Figure 1:
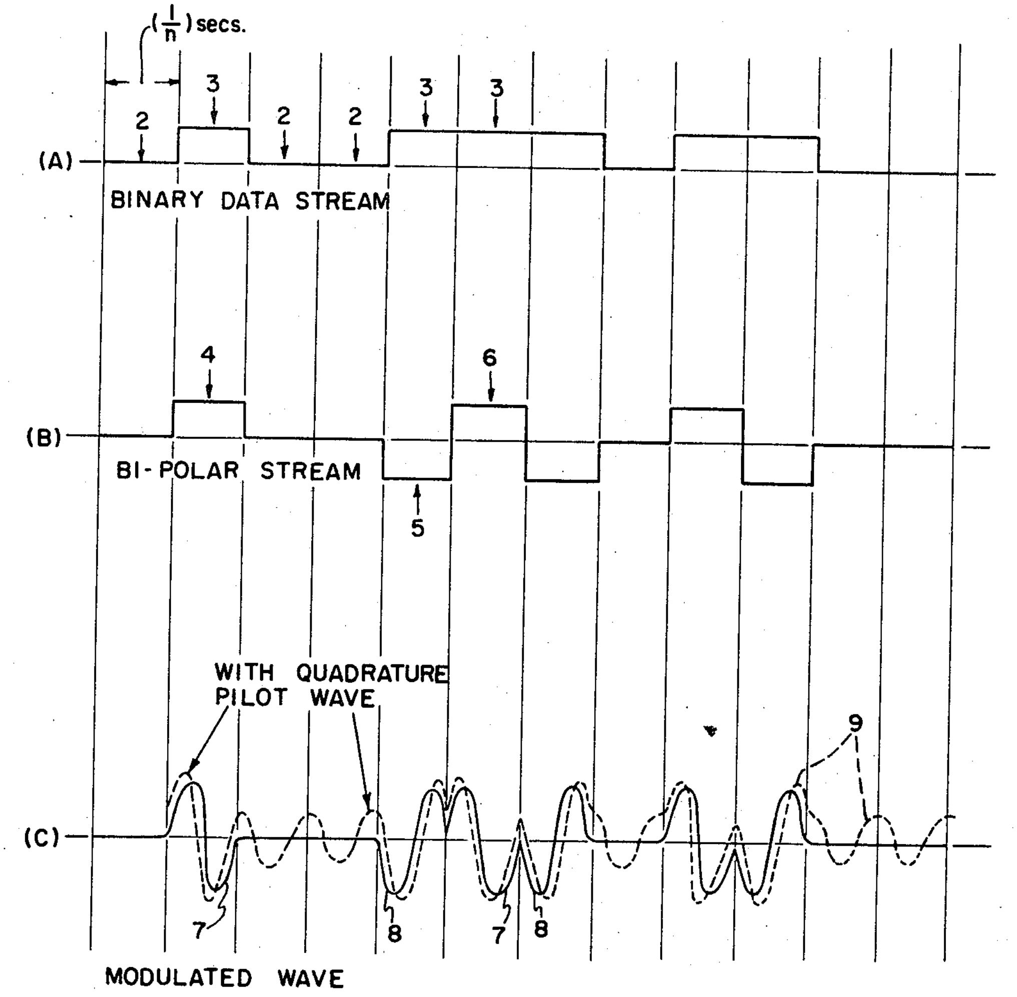

Referring to FIG. 1, the transmitter of the data-transmission system is arranged to receive an input signal in the form of a binary data stream of pulse-form signals at a predetermined repetition rate of (*n*) bits/second. FIG. 1(A) shows a typical portion of a typical such stream, a binary signal in which each 0 digit is represented by zero voltage (as at the positions 2) and each 1 digit is represented by the same positive voltage (as at the positions 3).

The arrangement to be described may be regarded as operating as follows. The binary data stream of FIG. 1(A) is first effectively converted (but see below) into a corresponding bipolar stream which differs from the binary data stream only in that each alternate one of those pulse-form signals 3 which represent 1 digits is effectively inverted in polarity. Thus, the binary signal 0,1,0,0,1,1,1,0,1,1, of FIG. 1(A) is effectively converted into the corresponding bipolar signal 0,1,0,0,−1,1,$-\gamma\pi^{1,0,1}$−1 of FIG. 1(B) : a typical succession of three of the pulse-form signals 3 of FIG. 1(A) being thus converted into the three pulse-form signals 4,5,6 respectively (FIG. 1(B)).

The transmitter is arranged to generate a continuous sine wave which is of frequency equal to the repetition rate (*n*), herein assumed for convenience to have a typical value of $n$ = 2,400 bits/second, and which is synchronized with the binary data stream. The arrangement is such that the bipolar stream so actuates the modulator of the transmitter that the output of that modulator comprises, corresponding to each non-inverted pulseform signal 4,6, . . . of the bipolar stream a single normal sinusoid (7,7, . . . in FIG. 1 (C)) of the continuous sine wave, corresponding to each inverted pulse-form signal 5, . . . of the bipolar stream a single inverted sinusoid (8,8, . . . in FIG. 1(C)) of the continuous sine wave, and corresponding to each pulse-form signal 2 of zero voltage (corresponding to a 0 digit) a signalless interval of duration equal to (1/*n*) seconds.

This modulator output, having the form of a modulated carrier wave made up of the adjoining or separated sinusoids 7,8, is combined at the transmitter with a first pilot signal in the form of a continuous wave which is of frequency equal to (*n*), which is in phase quadrature with the modulated carrier wave, and which is of smaller amplitude than the modulated carrier wave. The signal resulting from the combination is shown by the broken line 9 of FIG. 1(C).

At the receiver, the first pilot signal can be extracted from the signal 9 without interfering with the modulated carrier wave, because the bipolar stream has zero D.C. and thus the modulated data stream has no component at the frequency (*n*). The first pilot signal can thus be effectively used at the receiver to demodulate the modulated carrier wave, making use of the valuable property that, since any frequency offsets suffered by the modulated carrier wave and the (equal frequency) first pilot signal during transmission to the receiver will be equal, then the demodulator output will thus automatically be independent of such frequency offset.

The transmitter is also arranged to transmit a second pilot signal (not shown in FIG. 1) in the form of a continuous wave which, in the case where $n$ = 2,400, conveniently has a frequency of 600 Hz and which is combined at the transmitter with the signal 9 (FIG. 1(C)). At the receiver, the first and second pilot signals, nominally of frequencies 2,400 Hz and 600 Hz respectively but possibly both altered in frequency by the same amount due to frequency offset during transmission to the receiver, are effectively arranged to beat together to produce a wave of frequency 1,800 Hz free from frequency offset, the latter wave being arranged to generate at the receiver a timing wave of frequency 2,400 Hz free from frequency offset. (It will be clear that, in general, the timing wave may be generated in this manner from second and third pilot signals of which the third pilot signal need not necessarily be the first pilot signal.)

At the receiver, the demodulator output will in general tend to be a band-limited version of the bipolar stream (FIG. 1(B)) from which the binary data stream FIG. 1(A) is reconstituted with the aid of the timing wave.

Figure 2A:
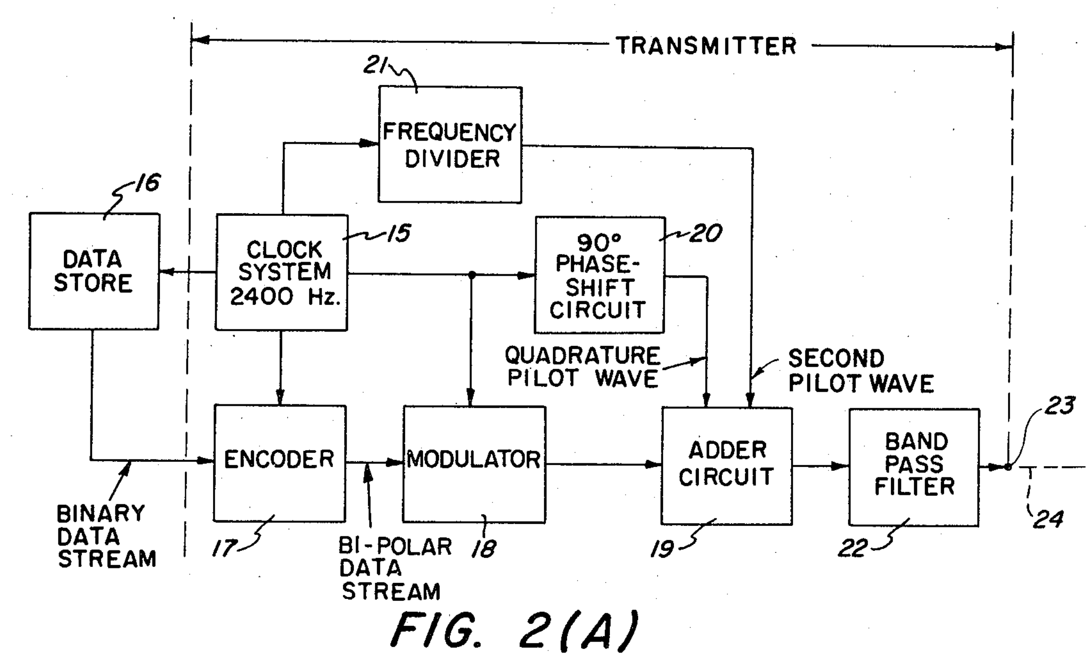

Referring to FIG. 2(A), the transmitter includes a clock system 15 for generating wave signals of the frequency (*n*) = 2,400 Hz. One output of the system 15 comprises a 2,400 Hz clock wave which is supplied to a data store 16 (not forming a part of the invention) whereby, in known manner, the data store 16 supplies to an encoder 17 a binary data stream of the form of FIG. 1(A) and at a repetition rate of (*n*) = 2,400 bits/second.

The encoder 17 is also supplied, from the system 15, with pulses synchronized with the said clock wave, and may conveniently be regarded (see below) as generating the bipolar stream of FIG. 1(B), which stream is supplied to the modulator 18. The modulator 18 is also supplied, from the clock system 15, with a sine wave of frequency (*n*) = 2,400 Hz, and the modulator output is supplied to one input of an adder circuit 19 which is also supplied with, at a second input, the said quadrature first pilot signal (derived, via a 90° phase-shift circuit 20, from the sine-wave input to the modulator 18), and, at a third input, with the second pilot signal of frequency 600 Hz (derived, via a frequency divider 21, from the 2,400 Hz clock-wave output of the clock system 15).

Figure 2B:
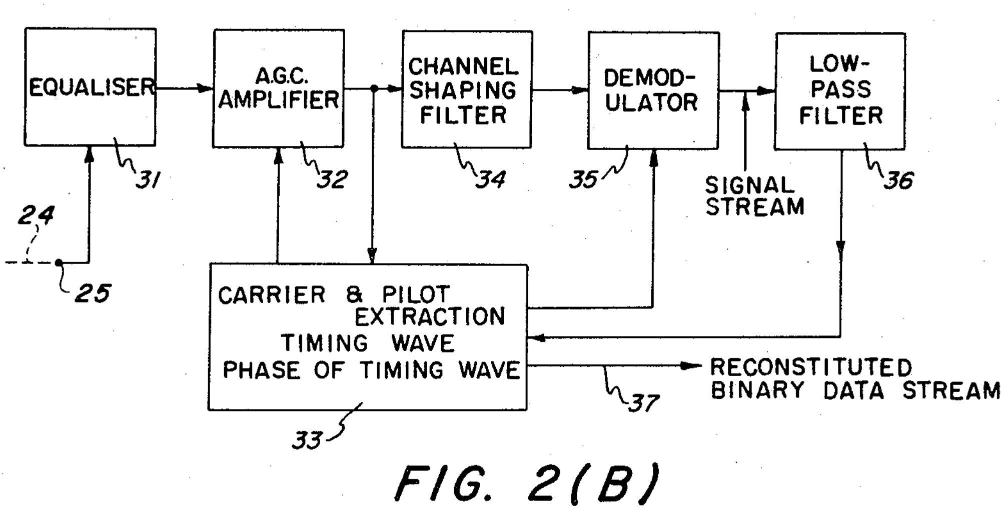

The adder circuit 19 combines the signals supplied to its three inputs and supplies the combined signals, via a band-pass filter 22, to the transmitter output 23 which is connected, in use of the system, by way of a transmission link 24 to the input 25 (FIG. 2(B)) of the receiver.

The band-pass filter 22 is added to limit the spectrum of the waves sent over the transmission link 24, without affecting the attenuation and uniformity of time delay up to the frequency of (*n*) = 2,400 Hz. In the present case, it conveniently has a pass band extending from 300 to 3,300 Hz.

Referring to FIG. 2(B), the receiver input at 25 is passed through an equalizing circuit 31 to compensate for the characteristics of the transmission link 24, and then through an A.G.C. amplifier 32. At the output of the amplifier 32, the two pilot signals are effectively extracted and supplied to an elaborate system of circuits indicated at 33, whilst the modulated carrier wave is passed through a channel-shaping filter 34 to the demodulator 35 for demodulation with the aid of a signal derived (within the circuits 33) from the (nominally) 2,400 Hz quadrature first pilot signal.

The resulting output of the deomodulator is supplied, via a low-pass filter 36, to the circuits 33 wherein the said timing wave of frequency 2,400 Hz is generated and the phase of the timing wave automatically adjusted such that the output of the filter 36 is effectively sampled at such suitable intervals that a reconstituted binary data stream (of the form of FIG. 1(A)) is obtained at the output 37.

The circuits 33 also control the operation of the A.G.C.amplifier 32.

THE TRANSMITTER

Figures 3A, 3B:
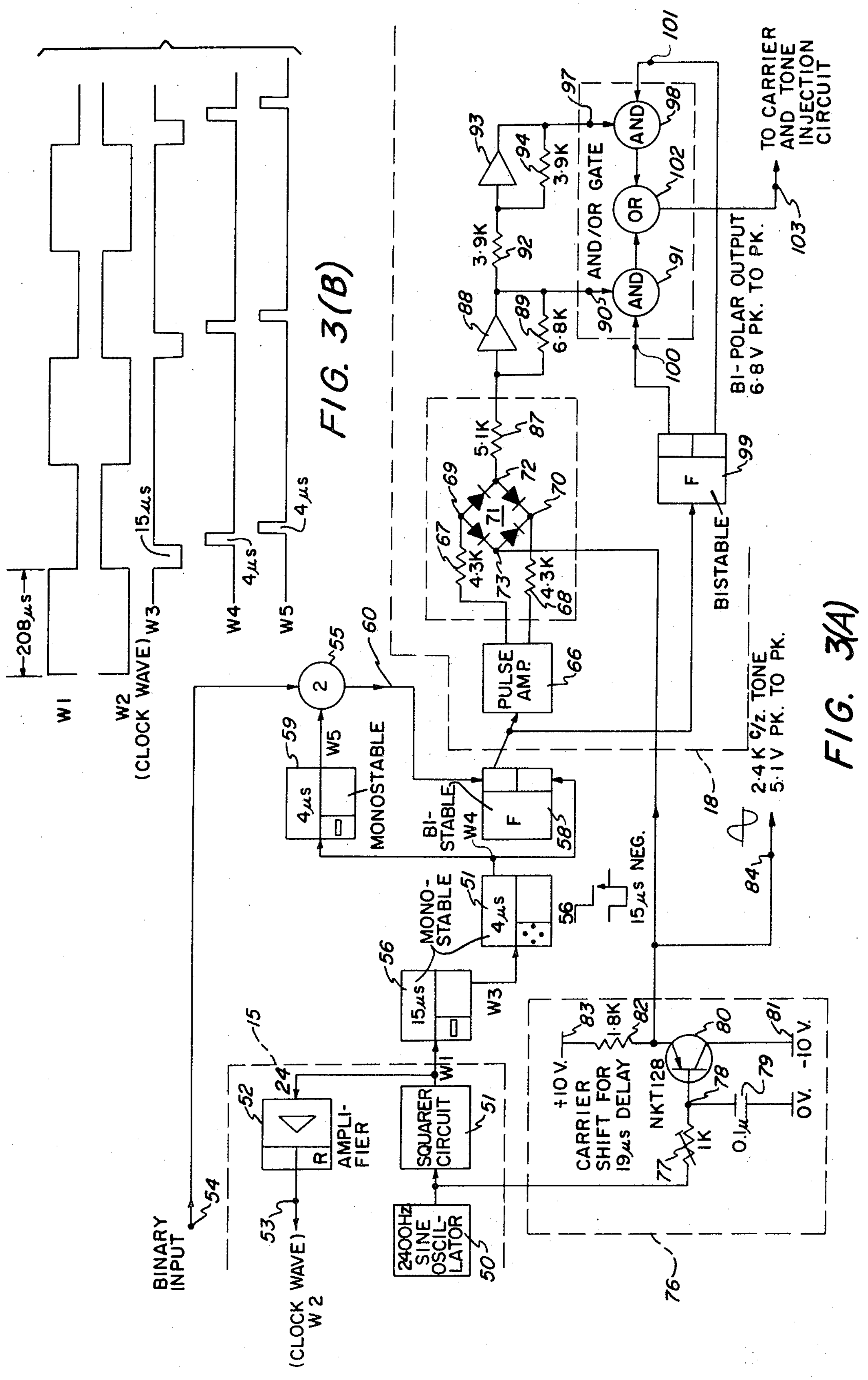
FIG. 3(A) is a part-schematic circuit diagram of the clock system, the encoder and the modulator of FIG. 2(A)
FIG. 3(B) is pulse wave forms appearing at certain points of the transmitter.

FIG. 3(A) shows the clock system 15, the encoder 17 and the modulator 18 of FIG. 2(A).

The clock system is based upon a 2,400 Hz sine-wave oscillator 50 of which the output is supplied to a square circuit 51 of which the output is the square-wave W1 shown on FIG. 3(B). The wave W1 is amplified and inverted by an amplifier 52 to provide, at a terminal 53, the said 2,400 Hz clock wave in the form of the square-wave W2 shown in FIG. 3(B). This clock wave is supplied from the terminal 53 to the data store 16 (FIG. 2(A)), to control (as described above) the supply, by the data store 16, of the binary data stream to the terminal 54 (FIG. 3) which is connected to one input of an AND gate 55.

The square wave W1 is also supplied to the input of a monostable circuit 56 to derive, at the output of the circuit 56, a wave W3 (shown in FIG. 3(B)) comprising a train of negative-going pulses 15 microseconds wide, each such pulse commencing at a negative-going changeover of the wave W1. The wave W3 is supplied to the input of a further monostable circuit 57 to derive, at the output of the circuit 57, a wave W4 (shown in FIG. 3(B)) comprising a train of positive going pulses 4 microseconds wide, each such 4-microsecond pulse immediately following a corresponding one of the 15 microsecond pulses, so as to provide an overall delay (relatively to the negative-going changeovers of W1) of 19 microseconds.

The pulses W4 are supplied, firstly, to the reset input of a bistable circuit 58, which thus tends to be reset (if necessary) at the rate of 2,400 Hz, and are also supplied to the input of a monostable circuit 59 to derive, at the output of the circuit 59, a wave W5 (shown in FIG. 3(B)) comprising a train of positive-going pulses 4 microseconds wide, each pulse of the train W5 immediately following a corresponding one of the pulses of the train W4.

The pulses W5 are supplied to the second input of the AND gate 55. The arrangement is such that if, during the duration of a given pulse of the train W5, there is at the terminal 54 a positive voltage corresponding to a binary 1, then that positive voltage enables the gate 55 to pass that given pulse over the line 60 to the set input of the bistable circuit 58 to so change the state of that bistable circuit that its output changes from a lower voltage (representing a binary 0) to a higher voltage (representing the binary 1); the bistable circuit 58 thereafter remains set until it is reset by the next W4 pulse. If, on the other hand, there is at the terminal 54 a zero voltage corresponding to a binary 0, then the gate 55 is not enabled and the output of the bistable circuit 58 continues to represent a binary 0.

The output of the bistable circuit 58 is supplied to a pulse amplifier 66 of the balanced-output type, wherein the binary-1 output pulses of the circuit 58 are effectively amplified and supplied, via resistances 67 and 68 respectively, to the D.C. terminals 69 and 70 of a diode rectifier bridge modulator 71 so as to provide, for the duration of each such binary-1 output pulse, a low-impedance path between the A.C. terminals 72 and 73 of the bridge 71. If, however, the bistable circuit 58 remains in its reset state (corresponding to a binary 0), then the path between the A.C. terminals 72 and 73 remains of high impedance.

The output of the 2,400 Hz sine-wave oscillator 50 is also supplied to the input of a phase-shift circuit 76 arranged to produce a 19-microsecond delay of that sine-wave, the phase shift and delay being effected by passing the input signal through a resistance 77 to a common point 78 which is connected via a capacitance 79 to earth and which is also connected to the base of a transistor 80 of which the collector is connected to a negative supply line 81 and the emitter is connected, via a resistance 82, to a positive supply line 83. The output of the circuit 20 is taken from the collector of the transistor 80 and is supplied, firstly, to a terminal 84 and, secondly, to the A.C. terminal 73 of the bridge 71.

The terminal 72 of the bridge 71 is connected, via a resistance 87, to the input of a first amplifying stage of the virtual-earth-input type and comprising a high-gain amplifier 88 having a feedback resistance 89 connected between its output and its input. The output of this amplifying stage is supplied, firstly, to one input 90 of an AND gate 91, and, secondly, via a resistance 92, to the input of a second amplifying stage of the virtual-earth-input type and comprising a high-grain amplifier 93 having a feedback resistance 94 connected between its output and its input. The output of this amplifying stage, which is inverted relatively to and of equal amplitude to that of the first, is supplied to one input 97 of an AND gate 93.

The output of the bistable circuit 58 is also supplied to the input of a bistable circuit 99, the arrangement being such that the leading edge of each of the higher-voltage pulses (representing the binary 1 digits) at the output of the circuit 58 causes the circuit 99 to change its state. Thus, in one state of the bistable circuit 99, a positive signal is supplied from one of its outputs to the other input 100 of the AND gate 91 to enable that gate, and in the other state of the circuit 99 a positive signal is supplied from the other of its outputs to the other input 101 of the AND gate 98.

The arrangement is thus such that (a) if a binary-0 signal appears at the terminal 54, then the bridge 71 remains of high impedance and no effective signals appear at the inputs 90 and 97 respectively of the AND gates 91 and 98, while (b) for each alternate binary-1 signal appearing at the terminal 54, similar but relatively inverted sinusoids of frequency 2,400 Hz appear at the inputs 90 and 97 respectively and, according as the gate 91 or the gate 98 is enabled according to the state of the bistable circuit 99, one or the other of those sinusoids is passed from the relevant AND-gate output to an OR gate 102 of which the output is supplied to a terminal 103.

It will be noted that, in terms of FIG. 1, the bipolar stream of FIG. 1(B) is not generated directly in the circuit of FIG. 3; thus, in the case of the transmitter (but not, see below, of the receiver) of the data-transmission system being described, the bipolar stream of FIG. 1(B) is merely a helpful concept. However, in FIG. 3(A), the signals appearing at the terminal 103 are the sinusoids 7,8, . . . of FIG.1(C).

Figure 4:
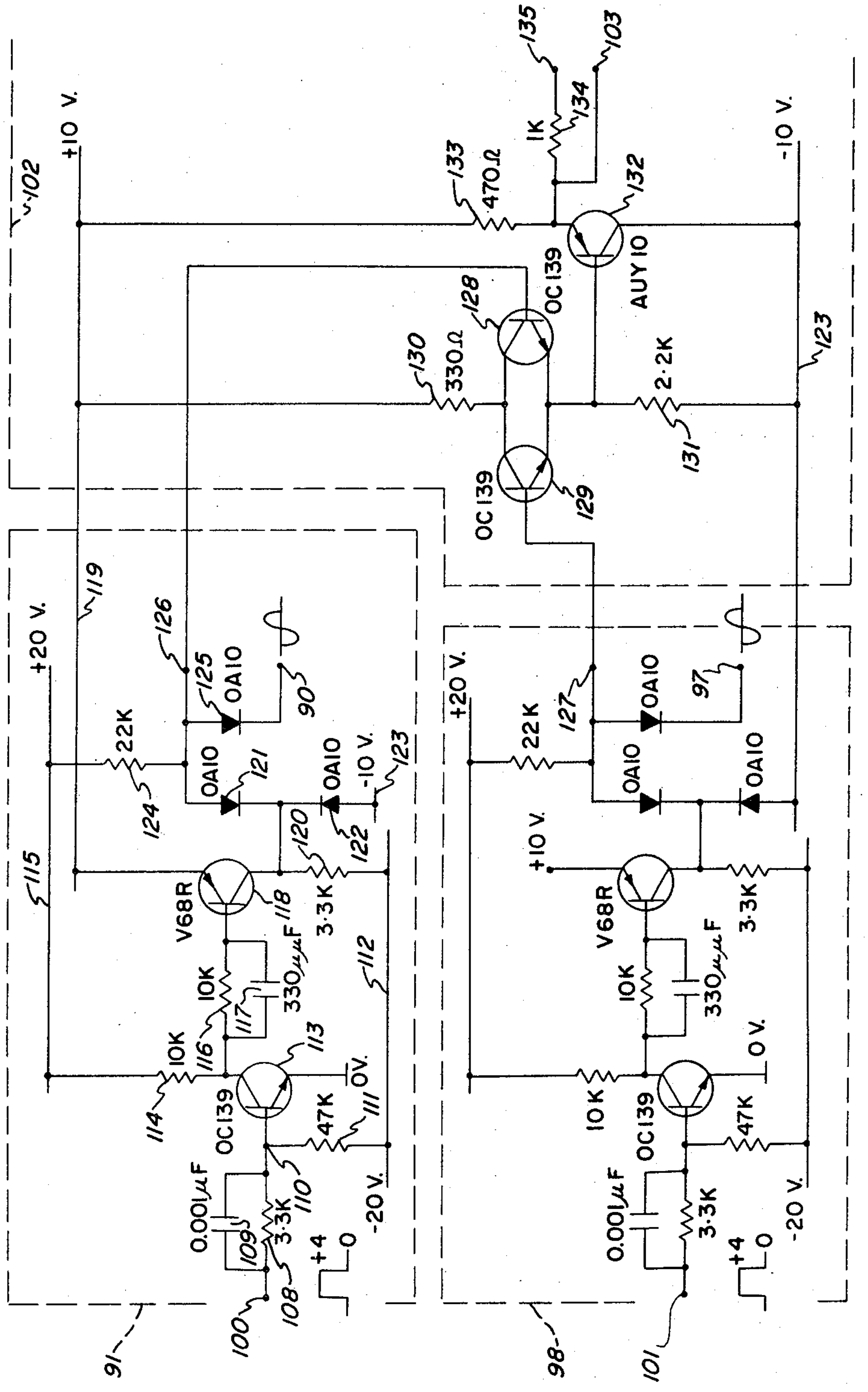
FIG. 4 is a circuit diagram of the and/or gate of FIG. 3.

FIG. 4 is a circuit diagram of the AND/OR gate system of FIG. 3(A)., comprising the gates 91, 98 and 102. Referring to FIG. 4, the input terminal 100 of the AND gate 91 is connected, via a resistance 108 shunted by a capacitance 109, to a common point 110 which is connected, firstly, via a resistance 111 to a negative supply line 112, and, secondly, to the base of a transistor 113 of which the emitter is connected to earth and the collector is connected, firstly, via a resistance 114 to a positive supply line 115, and, secondly, via a resistance 116 shunted by a capacitance 117, to the base of a transistor 118.

The emitter of the transistor 118 is connected to a further positive supply line 119, and the collector of the transistor is connected, firstly, via a resistance 120 to the line 112, and, secondly, to the cathodes of two opposed diodes 121 and 122. The anode of the diode 122 is connected to a further negative supply line 123, and the anode of the diode 121 is connected, firstly, via a resistance 124 to the supply line 115, and, secondly, to the anode of a diode 125 of which the cathode is connected to the other input terminal 90 of the gate 91, and, thirdly, to the terminal 126 which constitutes the output terminal of the gate 91.

The AND gate 98 is identical to the gate 91 and has input terminals 101 and 97, and an output terminal 127.

The remainder of the circuit of FIG. 4 constitutes the OR gate 102 (FIG. 3(A)). Thus, the terminals 126 and 127 are respectively connected to the bases of two transistors 128 and 129 of which the commoned collectors are connected via a resistance 130 to the supply line 119, and of which the commoned emitters are connected, firstly, via a resistance 131 to the supply line 123, and, secondly, to the base of a transistor 132 of which the collector is connected to the supply line 123, and of which the emitter is connected, firstly, via a resistance 133 to the supply line 119, and, secondly, via a resistance 134 to an output terminal 135, and, thirdly, directly to the output terminal 103 (FIG.3(A)).

Figure 5:
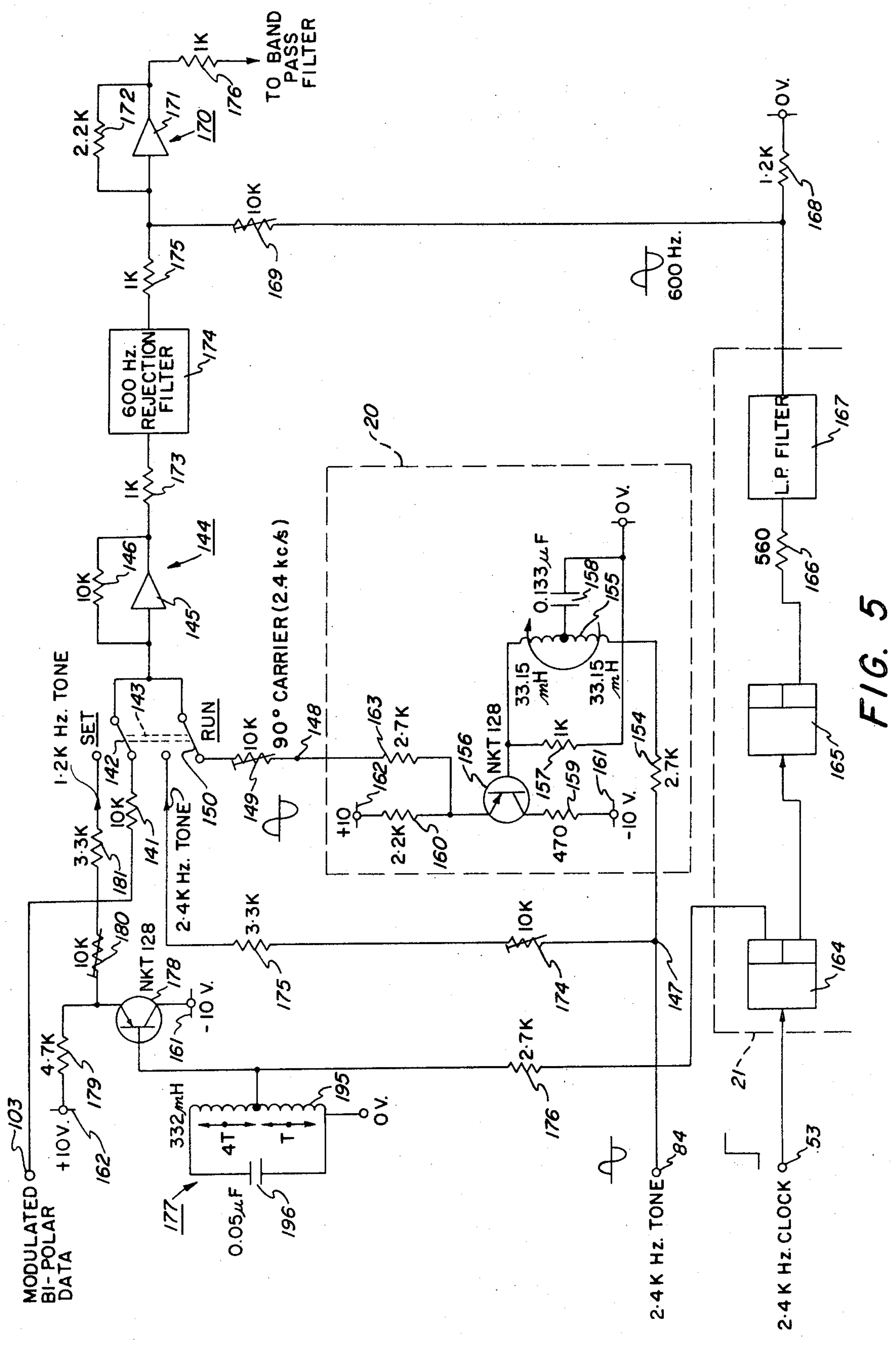
FIG. 5 is a part-schematic circuit diagram of the frequency divider, the 90° phase-shift circuit, and the adding circuit of FIG. 2(A)

FIG. 5 shows the frequency divider 21, the 90° phase-shift circuit 20, and the adder circuit 19, of FIG. 2(A). The sinusoids appearing at the output terminal 103 (FIGS.3,4) of the OR gate 102 are (FIGS. 5) normally supplied, via a resistance 141 and one normally closed contact 142 of a two-pole set/run changeover switch 143, to the input of an amplifying stage 144 of the virtual-earth-input type and comprising a high-gain amplifier 145 having a feedback resistance 146 connected between its output and its input.

The delayed 2,400 Hz sine-wave appearing at terminal 84 (FIG.3(A)) is supplied to the input terminal 147 (FIG. 5) of the 90° phase-shift circuit 20 of which the output (at terminal 148) is also supplied, via a variable resistance 149 and the other normally closed contact 150 of the switch 143, to the input of the amplifying stage 144.

The two signals thus supplied to the stage 144 are thus the sinusoids 7,8, . . . (FIG.1(C)) and the quadrature first pilot signal, the stage 144 acting to combine these signals to form the resultant signal 9 (FIG. 1(C)). The resistance 149 can be adjusted to vary the amplitude of the quadrature signal.

In the phase-shift circuit 20, the input terminal 147 is connected, via a resistance 154, to one end of a centrally-tapped inductance 155 of which the other end is connected, firstly, to the base of a transistor 156, and, secondly, via a resistance 157 to earth. The center tap of the inductance is connected, via a capacitance 158, to earth. The collector of the transistor 156 is connected to a negative supply line 161, via a resistance 159, and the emitter of the transistor is connected, firstly, via a resistance 160 to a positive supply line 162, and, secondly, via a resistance 163, to the terminal 148.

The 2,400 Hz clock wave appearing at the terminal 53 (FIG.3(A)) is (FIG. 5) supplied to the input of a first divide-by-two circuit 164 of which one output is supplied to the input of a second divide-by-two circuit 165 of which the output includes the 600 Hz second pilot signal and is supplied, via a resistance 166, to the input of a low-pass filter 167 (arranged to filter off 1,200 Hz and higher-frequency components) of which the output is supplied, via a variable resistance 169, to the input of an amplifying stage 170 of the virtual-earth-input type and comprising a high-gain amplifier 171 having a feedback resistance 172 connected between its output and input. The output of the filter 167 is also connected, via, the resistance 168, to earth.

The output of the amplifying stage 144 is supplied, via resistance 173, to the input of a narrow stop-band filter 174 centered at 600 Hz, the output of the filter being also supplied, via a resistance 175, to the input of the stage 170.

The stage 170 thus adds to the resultant signal 9 (FIG.1(C)) the 600 Hz second pilot signal, the output of the stage 170 being supplied, via a resistance 176, to the band-pass filter 22 (FIG.2(A)).

Figure 6:
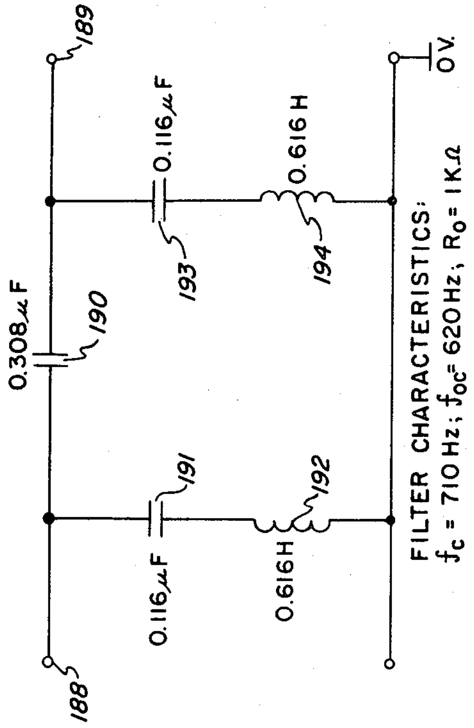
FIG. 6 is a circuit diagram of a filter employed in the circuit of FIG. 5.

FIG. 6 shows the circuit of the filter 174. The input terminal 188 of the filter is connected to the output terminal 189 via a capacitance 190, and is also connected to earth via a capacitance 191 connected in series with an inductance 192. The output terminal is similarly connected to earth via a capacitance 193 connected in series with an inductance 194.

For system adjustment purposes, in particular when the receiver equalizer 31 (FIG.2(B)) is an automatic equalizer as described in our co-pending patent application Ser. No. 87,546 filed on Nov. 6, 1970, the circuit of FIG. 5 may be arranged, by operation of the switch 143, to transmit instead a combination of two line-up signals respectively of frequencies 2,400 and 1,200 Hz. In this case, the 2,400 Hz signal at terminals 84 and 147 is supplied, via series-connected resistances 174 and 175 and the operated contract 150, to the input of the stage 144; also, the other output of the divide-by-two circuit 164 is supplied, via a resistance 176 and a narrow band-pass filter 177 (centered at 1,200 Hz), to the base of a transistor 178 of which the collector is connected to the supply line 161, and the emitter is connected, firstly, via the resistance 179 to the line 162, and, secondly, via the series-connected resistances 180 and 181 and the operated contract 142, also to the input of the stage 144.

The filter 177 comprises a tapped inductance 195 of which the opposite ends are bridged by a capacitance 196. The turns ratio of the two portions of the inductance is 4T:T as indicated, the end having the less turns being connected to earth. The tapping is connected to the base of the transistor 178.

THE RECEIVER

Referring to FIG. 7, the receiver input at 25 is passed through the equalizing circuit 31 to compensate for the characteristics of the transmission link 24. The circuit 31 may be an automatic equalizing circuit, as described in our co-pending patent application Ser. No. 87,546 filed on Nov. 6, 1970 now U.S. Pat. No. 3,670,269.

The output of the circuit 31 is passed to an A.G.C. amplifier 32 of which the gain is automatically controlled by a D.C. signal supplied from the output of a D.C. amplifier 210 and derived as below.

At the output of the A.G.C. circuit 32, the two pilot signals are effectively extracted as described below, whilst the modulated carrier wave is passed through the channel-shaping filter 34 to the switched demodulator 35 for the demodulation with the aid of a square-wave signal generated by the circuit 211 from the (nominally) 2,400 Hz quadrature first pilot signal, in the manner described below.

Figure 8:
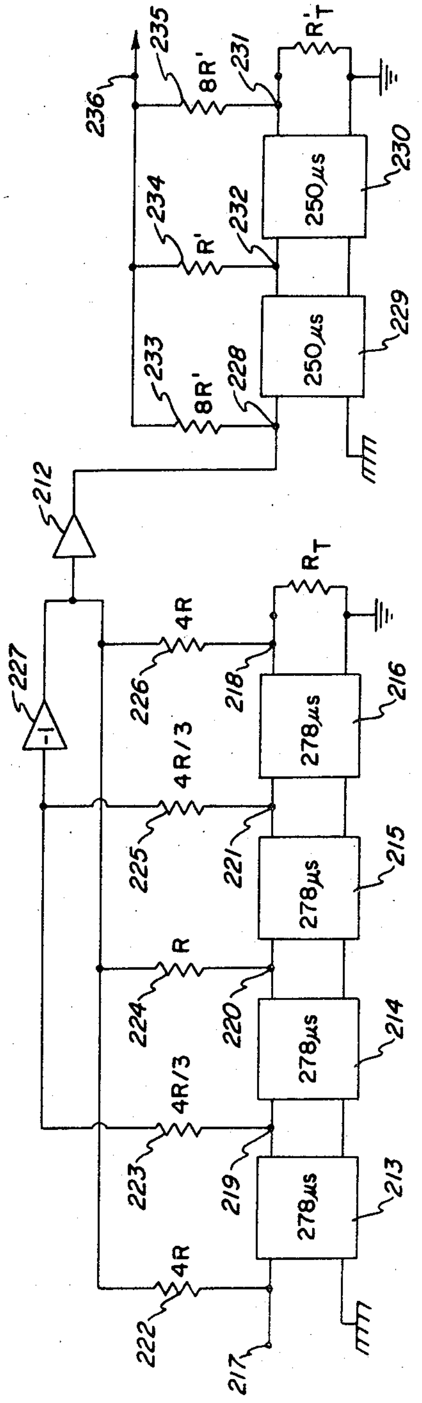
FIG. 8 is a part-schematic circuit diagram showing the form of the channel-shaping filter of FIG. 7.

The filter 34 is intended to produce zero intersymbol interference during operation of the overall system, and thus conveniently has an amplitude response which approximates to a full, raised-cosine response, as described in our co-pending patent application Ser. No. 87,547 filed on Nov. 6, 1970 wherein it is shown that the filter 34 may have, in idealized form, the form shown in the accompanying FIG. 8. (In modifications of the invention, the filter 34 may instead be included within the transmitter of the system, at the output of the modulator 18, or may be divided into two portions which co-operate to produce the desired result and which are respectively located at the output of the modulator 18 and at the position of the filter 34 in FIG. 7). In FIG. 8, the filter 34 comprises two filters, each in the form of a transversal network, connected in tandem by means of the buffer amplifier stage 212. The first filter comprises four identical time-delay networks 213,214,215 and 216 each having an input and an output and connected together in series, output to input, to form a chain. The chain has an input (afforded by the input of the network 213) which is connected to the input terminal 217 of the first filter, an output (afforded by the output terminal 218 of the network 216), and three intermediate junctions 219,220 and 221 each formed where the output of one of the networks 213–215 is connected to the input of the next succeeding network in the chain.

A separate corresponding pick-off resistance, 222 to 226, is connected to each of the said chain input, the said chain output, and the said intermediate junctions, so as to derive a corresponding number of pick-off signals equal in number to the number of the resistances. In the first filter, those pick-off signals derived via the resistances 222, 224 and 226 are summed by connection of the remote ends of those resistors to the input of the amplifier 212. Those pick-off signals which are derived via the resistances 223 and 225 are similarly summed by connection of the remote ends of those resistors to the input of an inverting amplifier 227 (of unit gain) of which the output is also supplied to the input of the amplifier 212 of which the output is supplied to the input terminal 228 of the second filter.

The second filter comprises two identical time-delay networks 229 and 230 similarly connected to form a chain having an input (terminal 228), an output (terminal 231) and one intermediate junction (terminal 232), each of the terminals being connected by way of a separate corresponding pick-off resistance (233, 235, 234 respectively) to the output terminal 236 of the overall filter 34. In FIG. 8, R and R′ indicate the magnitudes of basic resistances to be employed, and $R_T$ and $R_t'$ are terminating resistances.

At the output of the A.G.C. circuit 32 (FIG. 7) the (nominally) 600 Hz second pilot signal is effectively extracted (see below) and fed to the input of the switched demodulator 241, while the (nominally) 2,400 Hz quadrature first pilot signal is extracted by the band-pass filter 242.

The filter 242 should have adequate selectivity, whilst permitting a frequency offset of the first pilot signal of, say, 10 Hz for a phase change not exceeding 10°. FIG. 13 (A) shows a suitable circuit for the filter 242, in the form of a coupled-circuit filter of which the input terminal 243 is connected to the tapping (at 100 turns) of an inductance 244 (having 400 turns) of which the end terminal nearest the tapping is earthed and the other end terminal is connected, firstly, via a capacitance 245 to earth, and, secondly, via a capacitance 246 to the output terminal 247 which is also connected to earth via an inductance 248 bridged by a capacitance 249.

Figure 14B:
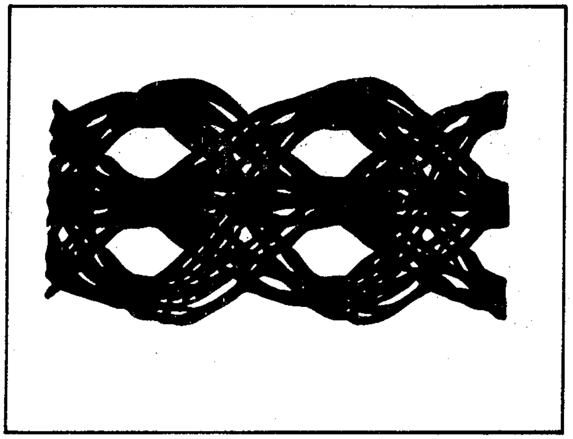

This arrangement gave the eye pattern of FIG.14 (A), taken with direct carrier supply and indicating an eye-opening loss of 4.6 db, with no frequency offset, compared with the loss of 5.8 db in the case (FIG.14(B)) where there was a carrier frequency offset of 10 Hz, the experiments being performed with both amplitude and delay median distortion.

"Eye pattern" is the term commonly used in the data-transmission art to describe the picture formed by superimposition of successive sweeps of a cathode-ray tube trance so as to display superimposed samples of the signal wave-form, the time base being synchronized with the data repetition rate or a sub-harmonic of the data repetition rate so that each sample consists of one or several waves in succession.

The first pilot signal thus extracted is amplified by a limiting amplifier 250 of which the output is a square wave of the same frequency, this square-wave being adjustably delayed in a variable-delay circuit 251 and being supplied to the input of a monostable circuit 211. The monostable circuit 211 is arranged to be triggered in response to each positive-going edge of the square wave supplied to it, and has a delay time equal to one-half of the bit period of ($1/n$) secs, i.e. 208.3 microseconds, so that the output of the circuit 211 is a delayed true square-wave of the same frequency as the received first pilot signal of (nominal) frequency 2,400 Hz, this square-wave being supplied to both of the demodulators 35 and 241. The time-delay of the circuit 251 is adjusted, in known general manner, to obtain good demodulation at the demodulator 35.

As described above, the output of the demodulator 35 is thus free from the effects of frequency offset.

The demodulator 241 effectively acts, as described above, to beat together the first and the second pilot waves, nominally of frequencies 2,400 Hz and 600 Hz respectively but possibly both altered in frequency by the same amount due to frequency offset, to produce an output in the form of a wave of frequency 1,800 Hz, which is selected by the band-pass filter 257. FIG. 13 (C) shows a suitable circuit for the filter 257, in the form of a coupled-circuit filter of which the input terminal 258 is connected to the tapping (at 53 turns) of an inductance 259 (having 541 turns) of which the end terminal nearest the tapping is earthed and the other end terminal is connected, firstly, via a capacitance 260 to earth, and, secondly, via series-connected capacitances 261 and 262 to earth, the capacitance 262 being bridged by a tapped inductance 263 (having 541 turns), and the tapping (at 166 turns from the earthed end terminal of the inductance) being connected to the output terminal 264 of the filter.

Figure 11:
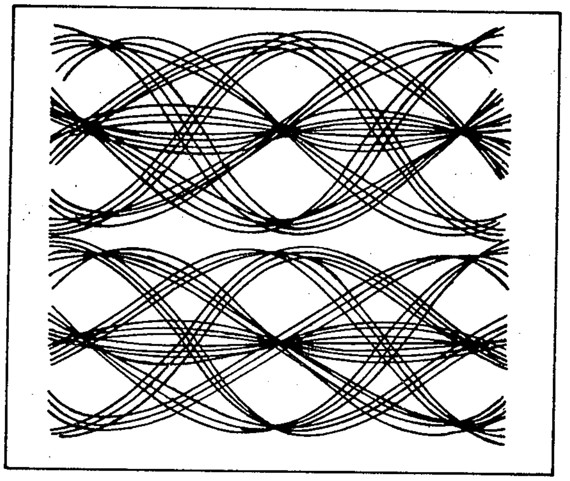
FIG. 11 shows a further eye pattern which is referred to in connection with the A.G.C. circuit of the receiver of FIG. 7.
Figure 12:
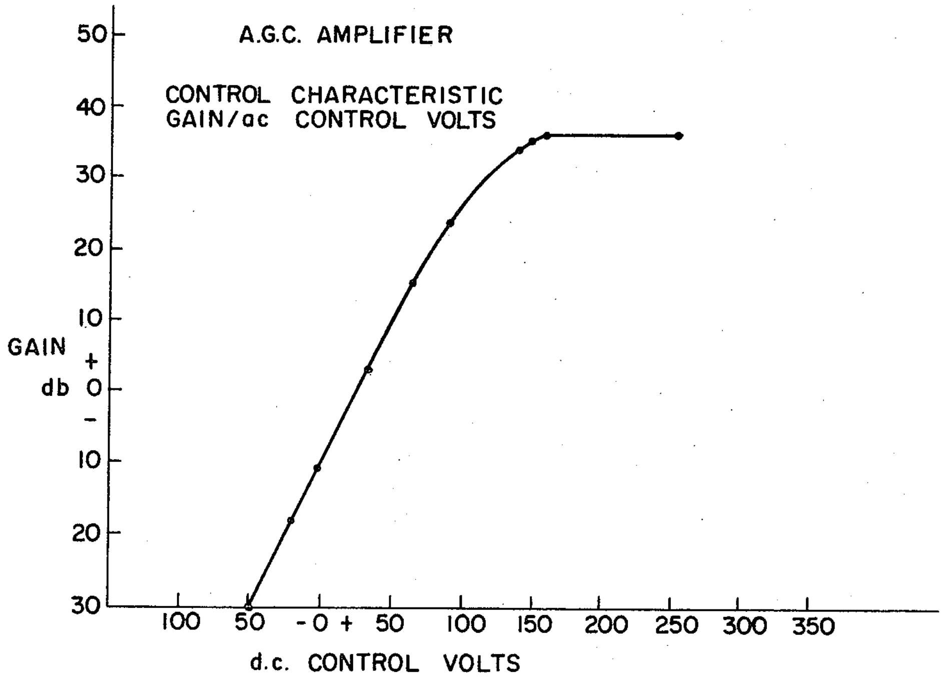
FIG. 12 is a curve illustrating the operation of the AGC circuit of FIG. 7.

The 1,800 Hz output of the filter 257 is (FIG. 7) supplied, firstly, to a circuit 265 wherein the signal is amplified and then full-wave-rectified, the resulting signal being supplied to a differencing circuit 268 which is also supplied with an adjustable back-off voltage 267 which the signal must exceed before the circuit 268 yields an output. The resulting output from the circuit 268 is integrated in an integrating circuit 266 of which the output is amplified by the D.C. amplifier 210 to provide the said signal which controls the gain of the A.G.C. amplifier 32. For stability the time constant of integration of the circuit 266 is about 2 seconds although the response time for compensation of small changes in level is much less. The adjustable back-off voltage supplied at 267 to the circuit 265 establishes the output level of the A.G.C. circuit 32. In the A.G.C. system employed, the A.G.C. amplifier 32 had a control characteristic (FIG. 12) which was approximately linear, a dynamic range of more than 35 db in gain, an A.G.C. output level of 3.5 volts r.m.s. at 1 Kilohm, and a change of output of less than 0.5 db for a 20db change of input. FIG. 11 shows the eye patterns for signals differing by 20 db from each other.

The A.G.C. system has necessarily a long time-constant, since it is based on the level of a pilot signal which must be selected, by filtering, from random data and noise. Assuming that the received level variations are slow, then the output level from the A.G.C. amplifier 32 will be held closely constant. Since, however, the energy of the modulated data stream is somewhat concentrated in the region of 1,200 Hz (corresponding to binary ones) and the A.G.C. is derived from a pilot wave of 600 Hz, there may be some variation of output level from the demodulator for transmission links 24 (FIG. 2) of differing characteristics, but published data on such characteristics indicate that the variation should be small. If this were the case, the decision level for the demodulated and rectified data wave may be fixed without much loss. However, the arrangements to be described include a variable slicing level, derived from the data stream, which should deal with most such characteristics.

The 1,800 Hz output of the filter 257 is (FIG. 7) also supplied to an amplifier 271 : the signal at this point is free from frequency offset.

The output of the amplifier 271 is a square-wave of frequency 1,800 Hz which is supplied to a divide-by-three circuit 272 of which the output, a square-wave of frequency 600 Hz, is automatically variably delayed (see below) in a variable-time-delay circuit 273 of which the output is supplied to a monostable circuit 274 so as to generate, at the output of the circuit 274, a train of pulses at a repetition rate of 600 per second, each pulse having a width of 200 microseconds.

This train of pulses contains a high proportion of fourth harmonic (2,400 Hz) which is extracted by the band-pass filter 275 to provide the timing wave, of frequency 2,400 Hz, referred to above.

FIG.13(B) shows a suitable circuit for the filter 275, in the form of a coupled-circuit filter which is of similar form to the filter 257 of FIG. 13(C), corresponding circuit elements having therefore been denoted by reference numerals which are the same but dashed. FIG.13(B) differs from FIG. 13 (C) only in that the capacitances have different values, as indicated, and in that the input terminal 258' is connected to the tapping (at 100 turns) of the inductance 259' (having 400 turns), and in that the tapped inductance 263' (having 400 turns) has its tapping (at 100 turns from the earthed end terminal of that inductance) connected to the output terminal 264' of the filter.

The timing wave is supplied to an amplifier 276 which yields two outputs which are similar but in antiphase. One of these two outputs is supplied to one input of an AND gate 277, and the other output is supplied to one input of an AND gate 278. The gates are so controlled (see below) by a bistable circuit 279 (of which the two outputs are respectively connected to the enabling other inputs of the two gates 277 and 278) that one or the other gate is always enabled. Thus, the outputs of the AND gates being connected respectively to the two inputs of an OR gate 280, the output of the OR gate 280 comprises the 2,400 Hz timing wave of which the phase can be changed by half a cycle by operation of the bistable circuit 279. This timing wave is shown at T10 (FIG. 10) for a given state of the bistable circuit 279, and is supplied (FIG. 7) to a monostable circuit 281 which is arranged to respond to each positive-going edge of the timing wave T10 to generate a train of positive pulses T11 (FIG. 10) having a repetition rate of 2,400 Hz, each pulse being 8 microseconds wide. The pulses T11 are supplied to the enabling input of an AND gate 282 for sampling of the data stream (see below), and are also supplied to an integrating circuit 283 for purposes to be described below.

Returning to the demodulator 35, the output of the demodulator is supplied to the low-pass filter 36 which rounds the waves but has a uniform attenuation and time-delay up to a frequency of at least 1,200 Hz.

The output of the filter 36 will in general tend to be a band-limited version of the bipolar stream (FIG.1(B)), which version, however, contains the transmitted data at the correct repetition rate of (*n*)=2,400 bits/second.

Figure 10:
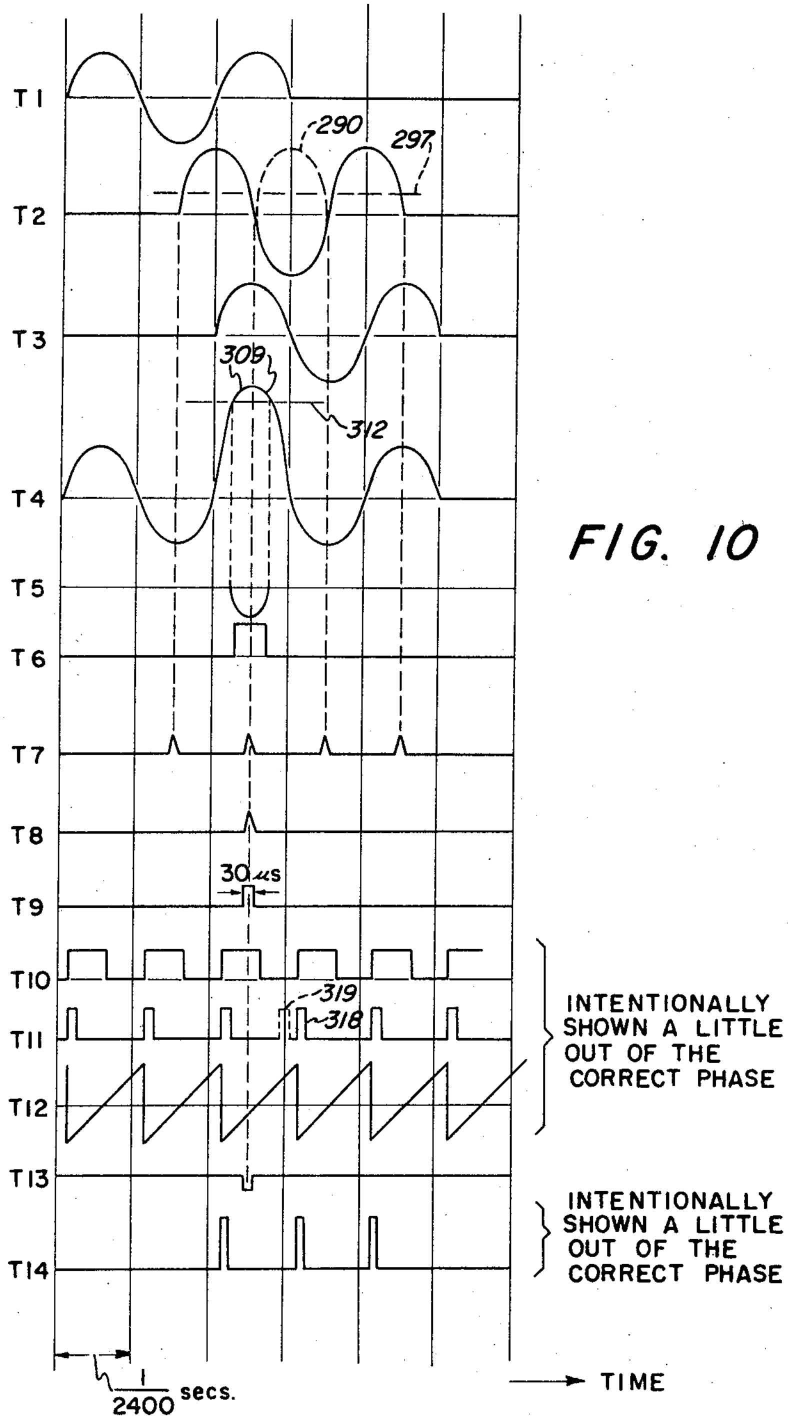
FIG. 10 shows various waveforms which may be present in the receiver of FIG. 7.

Under good circumstances, if the transmitter of the system transmits, in succession, signals corresponding to three binary ones of the binary data stream (FIG.1(A)), then the resultant signal appearing at the output of the filter 36 may have the form of 1½ sinusoids of a sine-wave of frequency 2,400 Hz, as indicated at T1 (FIG. 10). The signals T1 form part of a bipolar stream of the form of FIG. 1(B) and, in order to reconstitute from them (and similar other signals) the binary data stream of FIG.1(A), the signals T1 (and the similar other signals) must be sampled, with the aid of the 2,400 Hz timing wave, at suitable times.

Thus, the output of the filter 36 (e.g., signals T1) is amplified by an amplifier 287 and supplied to the input of a delay line 288 which has a delay time equal to 1½ bit periods at the data repetition rate of ($n$) = 2,400 bits/second. Thus, corresponding to input signals T1, the output of the delay line 288 will be the full-line curve T2 (FIG. 10) comprising the 1½ sinusoids T1 delayed as just mentioned.

The output of the delay line 288 is supplied to a circuit 289 wherein that output is first amplified and then full-wave rectified (as indicated by the broken line 290 of T2, FIG. 10), the resulting signal being amplified in an amplifier 291 of which the output is supplied, firstly, to the input of a comparator circuit 292, and, secondly, to the input of a circuit 293 wherein the signal is peak-rectified and thereafter amplified to produce, at the output of the circuit 293, a D.C. control signal which represents the peak level of the signals appearing at the output of the amplifier 291 and which is used to provide slicing levels for decision circuits.

The functioning of the controlled slicing-level system is based on the small probability that the number of consecutive binary zeros will exceed 20. This limits the time during which the peak-level rectification within the circuit 293 is required to hold up.

A peak-level rectification circuit discharge time of 1 second is suitable, the decay during this period being negligible. Conveniently, generally known means (not shown) is provided for reducing the effect of impulse noise on the slicing levels.

Thus, the control signal is supplied to a potentiometer 294 of which the tapping provides a selected fraction of the control signal, which fraction is supplied to the comparator circuit 292 to act as a D.C. slicing level (297,FIG.10).

Thus, according as the magnitude of the signal supplied to the comparator circuit 292 from the amplifier 291 exceeds or is less than that slicing level, so it is automatically adjudged to represent either a binary 1 or a binary 0 respectively, and the output of the comparator circuit 292 is automatically arranged accordingly to be either a positive voltage or zero respectively.

The resulting output of the comparator 292 is supplied, after amplification in the amplifier 295, to the other input of the AND gate 282 of which the enabling one input is supplied with the pulse T11 (FIG. 10). The arrangement is such that each pulse T11 enables the gate 282 for the duration of that pulse, so effecting a periodic sampling of the output of the amplifier 295, the sample being supplied from the output of the gate 282 to a pulse regenerator 296 of the NRZ (non-return-to-zero) type of which the output is intended to be the reconstituted binary data stream of FIG. 1(A) and is supplied to the output terminal 37.

Thus, in the case where the output of the filter 36 has the form of T1 (FIG. 10), and in the case where the pulses T11 have the relative phase indicated by their actual positions in FIG. 10, the sample signals obtained from the output of the gate 282 and corresponding to signals T1 are as indicated at T14 (FIG. 10) and may be regarded as samples of the full-line signals T2 after full-wave rectification as indicated at 290 (FIG. 10) and after the slicing as indicated at 297 (FIG. 10).

FIG. 15 is a block circuit diagram of the pulse regenerator 296. The sample signals T14 from the gate 282 are supplied to a bistable circuit 298. Two monostable circuits, 299 and 300, are triggered respectively, to provide 208-microsecond output pulses, by output pulses obtained from one or the other of the outputs of the bistable circuit 298. The outputs of the circuits 299 and 300 are respectively supplied to the two inputs of an OR gate 301 of which the output will be of the form indicated at 302 in the case where the information comprises, in sequence, three ones, one zero, and a single one.

The remainder of the circuit of FIG. 7 comprises apparatus for controlling the sampling effected by the AND gate 282.

Figure 9:
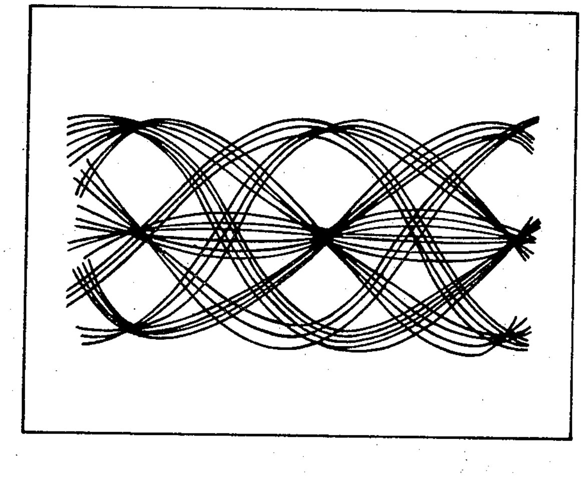
FIG. 9 shows an eye pattern which illustrates the operation of the sampling arrangements in the receiver of FIG. 7.

In order to obtain correct such sampling, the phase of the pulses T11, and thus the phase of the timing wave T10, in each case relatively to the output of the filter 36 (e.g. T1 in FIG. 10), must be correctly adjusted. In the present case, the data stream itself is employed to automatically control the phase of the timing wave T10, the method depending upon the observation that the crossover times (the instants at which the bipolar data wave passes through zero) are least disturbed (i.e. occur most regularly, or with least variability of timing about the mean) when there are three or more ones transmitted in the binary wave, (FIG.1(A)), since then there are triads of the form (1,−1,1) or (−1,1,−1) in the bipolar baseband signal (FIG. 1 (B), but as appearing at the output of the filter 36 of FIG. 7), the crossovers being grouped closely about the mid-point in time between the peaks (i.e., the points of maximum amphitude of the bipolar signal when successive ones are being received). In the present case, simple circuits are employed to determine when such a triad occurs, the crossover times are ascertained upon such an occurrence, and the phase of the timing wave is then automatically adjusted to agree with those crossover times. FIG. 9 shows the eye pattern of a pseudo-random series of pulses in the bipolar system, and shows that the crossovers behave as above.

In the arrangement to be described below, a triad of three binary ones in succession is detected by addition of two signal samples from the ends of a two-bit delay line. More generally, however, a series of N successive binary ones (where N is an integer which is odd and equal to at least three) could be detected by selecting $n+1/2$ samples from points separated by two-bit periods in a delay line of $(n-1)$ bit periods.

On this basis, the output (e.g. T2) of the delay line 288 is amplified and limited, full-wave rectified, inverted and sliced by the circuit 303, the output of which is (corresponding to T2) a series of triangular pulses (T7,FIG.10) occurring at the crossovers of the data wave T2. The pulses T7 are supplied to one input of and AND gate 304 which is arranged to allow such pulses to pass to the amplifier 305, only if there are three or more consecutive binary ones in the data stream, since only then (see below) is the AND gate 304 enabled.

Further, the output (e.g.,T2) of the delay line 288 is supplied, via a resistance 306, to a delay line 307 which has a delay time equal to ½ bit periods at the data repetition rate of ($n$) = 2,400 bits/second. Thus, corresponding to input signals T1 and T2, the output of the delay line 307 will be the curve T3 (FIG. 10) comprising the 1½ sinuoids T1 delayed by two bit periods.

The output of the filter 36 (e.g.,T1) and the output of the delay line 307 (e.g.,T3 corresponding to T1) are supplied to the input of a summing amplifier 308 of which the output will, corresponding to T1 occurring at the output of the filter 36, have the form of the full-line curve T4 (FIG. 10) obtained by the addition of T1 and T3. It will be seen that, during that one bit period for which the signals reinforce each other, the combined signal T4 exhibits a peak value indicated at 309. More generally, only if there is a sequence of three or more binary ones when there is a positive or negative peak at the beginning of delay line 288 there is a corresponding positive or negative peak at the end of the delay line 307. If, then, there is a triad of binary ones, the output of amplifier 308 includes a pulse of doubled amplitude (either of positive or of negative polarity); in any other case, the output of the amplifier 308 will be of significantly lesser magnitude.

The output of the amplifier 308 is fall-wave rectified in the circuit 313 and then supplied to the input of a comparator circuit 310 which is also supplied with a further output of the controlled slicing-level system. Thus, the D.C. control signal at the output of the circuit 293 is supplied to a potentiometer 311 of which the tapping provides a selected fraction of the control signal, which fraction is supplied to the comparator circuit 310 to act as a D.C. Slicing level (312.FIG.10). Thus, according as the magnitude of the signal supplied to the comparator circuit 310 from the circuit 313 is less than or exceeds that slicing level, so the output of the comparator circuit is arranged to be respectively zero or equal to the excess. This output is shown as the pulse T5 (FIG. 10) corresponding to the peak value 309 (FIG. 10) of the signal T4, each such pulse T5 being centered near the peak of one of the binary-one-signals in a sequence of three consecutive binary-one-signals.

The Output of the circuit 313 is supplied to the squaring amplifier 314 of which the output (T6,FIG.10) is supplied to the enabling other input of the AND gate 304. The gate 304 thus allows the triangular pulses T7 at its said one input to pass, only if there are three or more consecutive binary ones in the data stream, since only then is the requisite pulse T6 supplied. Thus, at the output of the gate 304 there are (T8,FIG.10) triangular pulses only at some of the crossover times, but these are correct times. The pulses T8, amplified by the amplifier 305, are supplied to a monostable circuit 315 which, corresponding to each pulse T8, produces a pulse T9 (FIG. 10) of 30-microsecond duration which is supplied, firstly, to one input of an AND gate 316 and, secondly, to one input of a sampling gate 317. The pulse T9 will be seen, when they occur, to correspond to crossovers of the signal T2: they act as timing pulses for the automatic adjustment of the phase of the 2,400 Hz timing wave, which phase is required to be such that the pulses T11 cause sampling, by the gate 282, to be centered about the positive and negative peaks of the signal T2. Thus (FIG. 10) the particular pulse 318 of the pulses T11 requires to be shifted to the left in the Figure, to the position 319 where it is contred about the peak of the signal 290 of the signals T2.

The pulses (FIG. 7) supplied to the input of the integrating circuit 283 (FIG. &) cause that circuit to produce a saw-tooth wave T12 (FIG. 10) which is synchronized with the timing wave and which is supplied to the other input of the sampling gate 317 such that the saw-tooth wave is sampled, during the occurrence of each pulse T9 at its other input, to provide at the output of the gate 317 and corresponding to each pulse T9, an error signal T13 (FIG. 10) of which the amplitude is required to be zero (corresponding to sampling at the center of one tooth of the saw-tooth wave T12) but may, if the phasing of the 2,400 Hz timing wave is not correct, vary between negative and positive maximum values.

The error signal T13 is supplied to an integrating circuit 320 of which the output is supplied, via the resetting circuit 321 of a uniselector, to the input of an amplifier 323.

The amplifier 323 is of the type having a biphase output, such that according as the error signal T13 is positive or negative, so a corresponding positive signal appears respectively at the first or the second output, 326 or 327 respectively, of the amplifier 323. The outputs 326 and 327 are respectively connected to the set inputs of two bistable circuits 324 and 325 which, when so set by the relevant positive signal, are arranged respectively to operate the appropriate one of the forward and backward operating solenoid circuits, 328 and 329, of the uniselector, over the lines 330 and 331 respectively. (The circuit arrangement is shown in FIG. 16, which shows the line 330 connected to a positive supply line 332 via the forward solenoid 328A bridged by a diode 328B, and the line 331 similarly connected to the line 332 via the reverse solenoid 329A bridged by a diode 329B.)

The uniselector has three contact-banks, 322A, 322B and 322C respectively (FIGS. 7 and 16).

The contacts of the first contact-bank 322A are (FIG.16) connected to tapping points on a chain of identical resistances 336, of which one end is earthed and the other end connected via a resistance 337, to a positive supply line 338. The wiper 339 of this bank thus supplies to the delay circuit 273, over a line 340, a step-wise variable voltage; thus, when the uniselector moves by one step, the delay of the circuit 273 is accordingly changed by a unit amount. (The wiper 339 is also connected via a capacitance 341 to earth.)

Each solenoid circuit 328, 329 (FIG. 7) is associated with a corresponding interrupter contact, 328A and 329A (FIG. 7) respectively, which is momentarily closed while the uniselector moves, to provide (respectively over lines 342 and 343) a reset signal to the reset input of the relevant one of the bistable circuits 324 and 325, thus in each case de-energizing the relevant solenoid 328, 329 to leave the uniselector at rest.

At the same time, the second contact-bank 332C of the uniselector, which bank has (FIG. 16) alternate ones of its contacts connected to earth and to a line 344 connected to the output of the integrating circuit 320, provides a momentary short-circuit which discharges the capacitor of the integrating circuit 320, thus removing the error-derived signal from the input to the amplifier 323. The short-circuit is provided by momentary bridging of adjacent contacts of the bank 332C, by the associated wiper 345.

If, at the existing position of the uniselector wipers, the delay of the delay circuit 273 is correct, then the error signal T13 will vanish. Otherwise, the integrating circuit 320 will provide a further output signal which will cause further stepping of the uniselector, in the manner just described.

If the uniselector commences operation with a central wiper-position, then a correct timing will always be found within the range provided; but, in certain other circumstances it is possible for the wipers to progress to an end position without achieving correct timing. To correct for this, the contacts of the third bank 322B are so arranged, in conjunction with the wiper 346, that when that wiper rests upon either of the endmost contacts (contacts 23 and 25 of the bank 322B, FIG. 16), a resetter circuit 321 (FIG. 7) is operated to cause the uniselector wipers to step to the said central position: during this stepping, relay contacts included in the circuit 321 open to temporarily disconnect the output of the integrating circuit 320 from the amplifier 323, the connection being restored when the wipers reach the central position. This arrangement is of generally known form : thus (FIG. 16), the wiper 346 is connected to the line 347 and also, via the winding RL of a relay having contacts RL1 and RL2, to a positive supply line 348. The said endmost contacts of the bank 322B are connected to earth and also, via the relay contacts RL1, to all but the central one of the remaining contacts of that bank. Of the relay contacts RL2, one is earthed and the remaining two are respectively connected to the output of the integrating circuit 320 and the input of the amplifier 323.

In a modification of this arrangement, the uniselector, bistable circuits 324 and 325, and resetter circuit 321 may be replaced by a reversible digital counter and digital-to-analogue convertor.

In this manner, the phase of the 2,400 Hz timing wave is thus varied, by automatic adjustment of the time-delay of the delay circuit 273, until the error signal T13 at the output of the sampling gate 317 is zero. This indicates that the timing pulses T9 supplied to the gate 317 are correctly centered about the center of one tooth of the saw-tooth wave T12 and, thus, that the pulses T11 cause the correct sampling to occur. There is a possibility of an incorrect zero error signal (T13) indication at the output of the sampling gate 317, if the timing is in error by half a bit, such that the pulses T9 are centered about the upright edges of the saw-tooth wave T12 : if this occurs, then there will be coincidence of the pulses T9 and T11 at the AND gate 316 such that a pulse T11 will be supplied by that gate to the bistable circuit 279 to change the state of that circuit, thus enabling the other one of the two AND gates 277 and 278 so as to select the other output from the amplifier 276 and thus shift the timing by the required half bit period.

The system described has two main advantages. Firstly as already mentioned, the bipolar modulated wave has its energy concentrated well below the carrier frequency of 2,400 Hz: as a result, the carrier wave can be easily extracted at the receiver without disturbing the data stream. Secondly, the system is very tolerant to line conditions (of the transmission link 24) at the upper frequencies of the audio band, where the attenuation and time-delay may increase rapidly.

What we claim is:

1. A transmitter in a data transmission system, comprising:
- a data store for providing a unipolar binary data stream;
- a clock source for providing a sinusoidal carrier wave of a predetermined frequency;
- means responsive to said carrier wave for converting the unipolar binary data stream into a bipolar data stream at a bit repetition rate corresponding to the predetermined frequency of the carrier wave and modulating said bipolar data stream with said carrier wave for forming, for each binary zero digit of the binary data stream, a corresponding signal-less interval, and, for each binary one digit of the binary data stream, a corresponding sinusoid which is alternately normal and inverted for successive binary one digits of the binary data stream;
- means responsive to the carrier wave for adding a first pilot wave to the modulated output of said converting and modulating means; and
- means for applying the resulting combination of the carrier modulated bipolar data stream and the first pilot wave to the transmission medium of the transmission system.

2. A transmitter according to claim 1, wherein said clock source is arranged to generate the clock signal in synchronism with the carrier wave, and said data store supplying said binary data stream at a bit repetition rate determined by the clock signal.

3. A transmitter according to claim 2, wherein the clock signal is used as the first pilot wave and is in phase quadrature with the sinusoids.

4. A transmitter according to claim 3, wherein the first pilot wave is of smaller amplitude than the amplitude of the sinusoids.

5. A transmitter according to claim 4, including means for transmitting first and second auxiliary pilot waves of different frequencies wherein the frequency of the first auxiliary pilot wave is an integral multiple of that of the second.

6. A transmitter according to claim 5, wherein the first auxiliary pilot wave is constituted by the first pilot wave.

7. A transmitter according to claim 1, wherein for each binary one digit of the binary data stream, a corresponding signal-less interval is formed, and, for each binary zero digit of the binary data stream, a corresponding sinusoid which is alternately normal and inverted for successive binary zero digits of the binary data stream is formed.

8. A receiver in a data transmission system, for receiving an incoming data signal comprising a binary data stream modulated by a carrier wave wherein each binary zero digit or the data stream is represented by a period of the carrier wave, and binary one digits of the data stream are represented by sinusoids which are alternately normal and inverted for successive binary one digits of the data stream, comprising demodulating means for recovering the binary data bit stream from the data signal, said demodulator means further including means arranged to receive together with the data signal a first pilot wave which has the same frequency as the carrier wave, the pilot wave being supplied to the demodulating means to effect demodulation of the data signal said demodulator means also further including means to receive together with the data signal, first and second auxiliary pilot waves of which the frequency of the first is an integral multiple of the second, said receiver further including a mixing circuit responsive to the auxilliary pilot waves and arranged to be responsive thereto and generate a timing wave of frequency equal to the repetition rate of the carrier wave.

9. A receiver according to claim 8, wherein the first auxiliary pilot wave is constituted by the first pilot wave.

10. A receiver according to claim 9, including a sampling circuit arranged to sample, in accordance with the timing wave, a signal derived from the demodulated signal, and also including a testing circuit responsive to the demodulated signal to generate timing signals indicating when the sampling circuit is required to effect the sampling, and a control circuit responsive to the timing signals to vary the phase of the timing wave so as to tend to effect the said required sampling.

11. A receiver according to claim 10, wherein the testing circuit is arranged to combine the demodulated signal and a signal derived from the demodulated signal but delayed relatively thereto by a predetermined amount and to test when those combined signals exceed a predetermined amount.

12. A receiver according to claim 11, wherein said delay is equal to two periods of the said repetition rate.

* * * * *